April 23, 1968     B. R. FOW ET AL     3,380,055

MILLIMETER WAVE RADIOMETER SYSTEM FOR MEASURING AIR TEMPERATURE

Filed Jan. 7, 1966     2 Sheets-Sheet 1

INVENTORS
BENJAMIN R. FOW
RICHARD F. HAZEL
WAYNE D. MOUNT
BY
*Robert J. Saare*
ATTORNEY

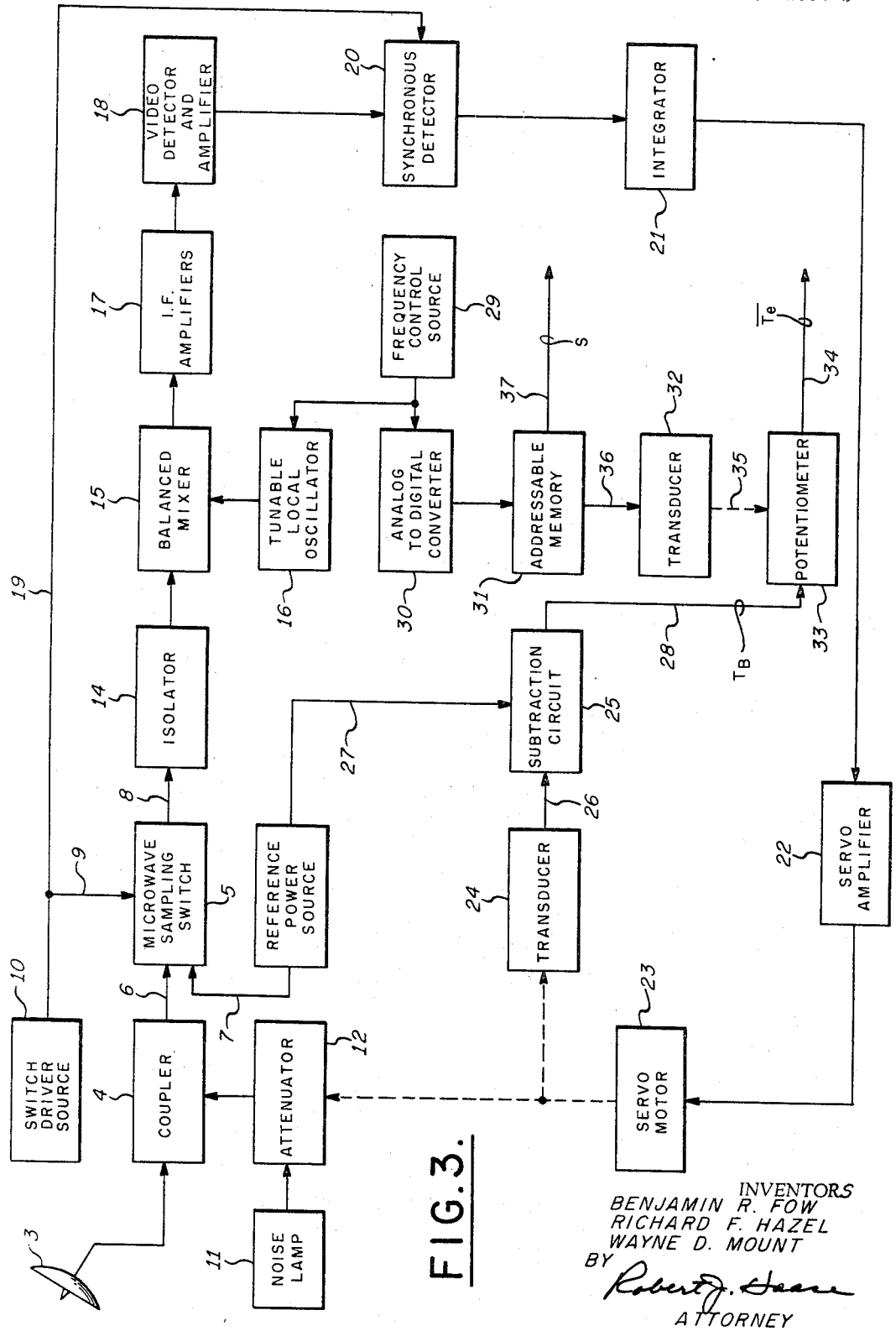

United States Patent Office 3,380,055
Patented Apr. 23, 1968

3,380,055
MILLIMETER WAVE RADIOMETER SYSTEM FOR MEASURING AIR TEMPERATURE
Benjamin R. Fow, Waltham, Richard F. Hazel, Marlborough, and Wayne D. Mount, South Lincoln, Mass., assignors to Sperry Rand Corporation, a corporation of Delaware
Filed Jan. 7, 1966, Ser. No. 519,354
6 Claims. (Cl. 343—100)

ABSTRACT OF THE DISCLOSURE

Temperature of a conical volume of air is measured by a directive radiometer in the band 60–120 kmc. using radiation from oxygen molecules. The length of the volume measured may be varied by varying the frequency of the radiometer because of its known relationship to the absorption coefficient. By measuring power level at different frequencies the weighted mean air temperature can be determined for different depths. Stored calibration corrections (variation of apex angle with frequency, etc.) are applied.

---

The present invention generally relates to systems for measuring atmospheric temperature and, more particularly, concerns a system for measuring atmospheric temperature in terms of the power of radiation received from oxygen molecules present in the atmosphere.

Present techniques for measuring atmospheric temperature make use of sensor devices which are inserted directly into the region of the atmosphere whose temperature is desired. The devices are introduced into the desired region by such means as instrumented towers, free ascending or tethered balloons and aircraft. The prior art direct measuring techniques have the disadvantages of introducing physical barriers and obstructions into the atmospheric region under examination, disturbing the environmental conditions under examination and being capable of measuring the temperature of only the air which is in contact with and immediately surrounds the sensor. Indirect measuring devices such as infrared sensors also have been proposed for determining the temperature of radiating bodies including air but they are restricted to use under favorable weather conditions. In addition, the signal spectrum within which infrared sensors operate is contaminated with signals from sources having no reliable relationship with respect to air temperature.

One object of the present invention is to provide a system for measuring indirectly and from a remote vantage point the temperature structure within a specified volume of air.

Another object is to provide a system for indirectly and remotely measuring the weighted mean value of the temperature of a predetermined and controllable volume of air.

These and other objects of the present invention, as will appear from a reading of the following specification, are achieved in a preferred embodiment by the provision of apparatus including a tunable radiometer responsive to signals received in the millimeter frequency band centered about 60,000 and 120,000 megacycles per second. The radiometer is especially adapted for determining the power level of received signals at selectable frequencies within the aforesaid bands. These signals naturally emanate from the oxygen molecules within the atmospheric volume under examination. The oxygen molecules are substantially uniformly distributed in the atmosphere and radiate signals at power levels proportional to their temperature. In accordance with the present invention, the weighted mean value of the temperature contributions of all of the radiating oxygen molecules is determined within a conical volume of air of substantially fixed apex angle but variable length as measured from the location of the radiometer. The length of the air volume is controllable in accordance with the frequency to which the radiometer is tuned on the basis that the distance through the atmosphere that the radiation from oxygen molecules can travel is a known function of the absorption coefficient which in turn is a known function of the frequency and altitude of said radiation. By tuning the radiometer to selectable frequencies throughout the band in which radiation from distant oxygen molecules is absorbed and reradiated by intervening molecules, the weighted mean air temperature value can be determined for different depths (as measured from the radiometer location) by measuring the power level of the received radiation at different frequencies. Each measured power level is translated into a respective weighted mean air temperature value by operating upon it with the appropriate calibration correction value which is a known function of the frequency at which each radiometer power level measurement is made. The distance over which this weighted temperature measurement applies is derived by operating upon the appropriate value of the atmospheric absorption coefficient which is a known function of the frequency and altitude at which each radiometer power level measurement is made.

For a more complete understanding of the present invention, reference should be had to the following specification and to the appended figures of which:

FIGURE 3 is a simplified block diagram of a preferred embodiment of the invention.

Figure 1:
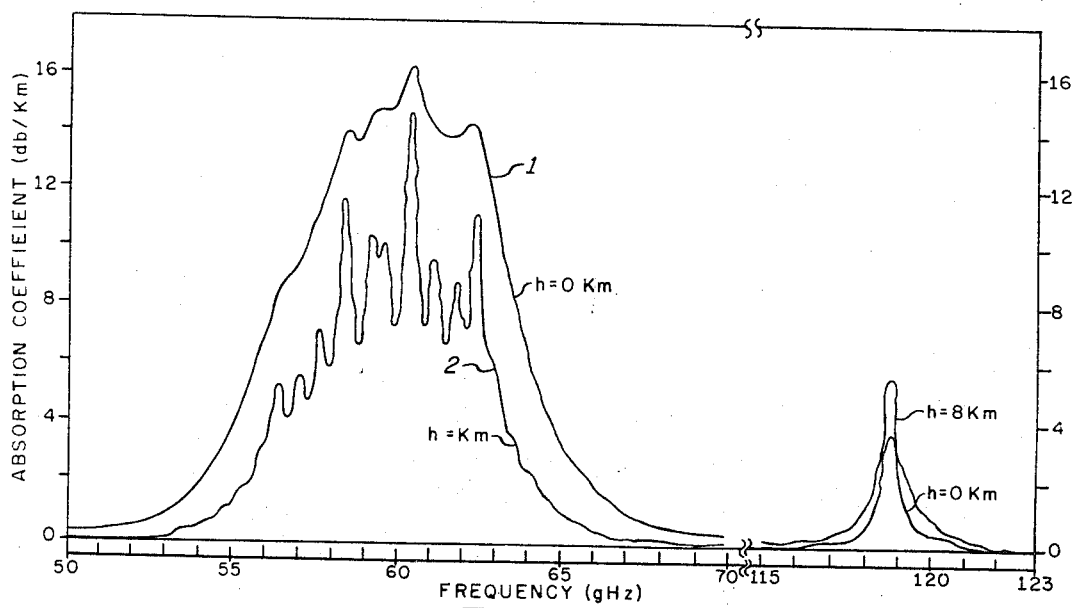
FIGURE 1 is a pair of plots of atmospheric absorption coefficient versus frequency for radiation received from oxygen molecules at atmospheric pressures obtained at sea level and at eight kilometers altitude.
Figure 2:
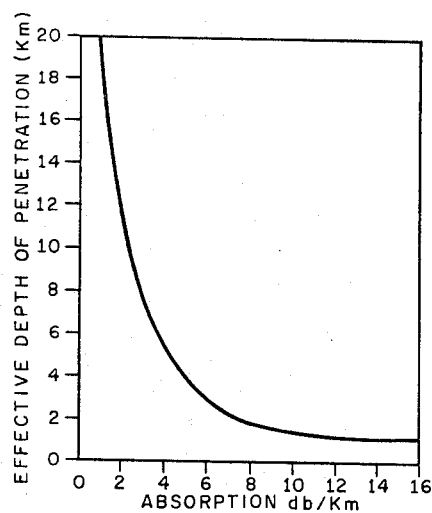
FIG. 2 is a plot of the effective depth of penetration of radiation received from oxygen molecules versus atmospheric absorption coefficient.

Referring to FIGURE 1, curves 1 and 2 respectively represent the values of the atmospheric absorption coefficient at two representative altitudes (by way of example, sea level and eight kilometers altitude) for the different frequency components of radiation received from oxygen molecules. It can be seen that a value of atmospheric absorption coefficient is specified for every known frequency component at a given altitude. For example, at sea level altitude, the oxygen molecule radiation component frequency of 60,000 megacycles per second encounters an atmospheric absorption coefficient of approximately sixteen decibels per kilometer. From the absorption coefficient, it is possible to calculate the distance through the atmosphere that radiation from an oxygen molecule can effectively penetrate and provide a significant contribution to a total signal detected by a radiometer. Some calculated distances are represented in FIGURE 2 which is a plot of the values of the effective depth of penetration in kilometers versus values of the atmospheric absorption coefficient in decibels per kilometer. The effective depth of penetration values plotted are those obtained at sea level. It should be noted by reference to FIGURES 1 and 2 that 97% of the signal detected by the radiometer at 60,000 megacycles per second (60 gHz.) emanates from a distance equal to or less than 1.25 kilometers from the radiometer antenna. The frequency of 60 gHz. corresponds to an absorption coefficient of approximately 16 db/km. (from FIGURE 1) whereas 16 db/km. corresponds to an effective depth of penetration of about 1.25 km. (from FIGURE 2). Similarly, the effective depth of penetration for signals at 55 gHz. is 5.5 km.

The brightness temperature $T_B$ (power level of received signals) which the radiometer actually measures can be translated into the desired weighted means temperature value by multiplying the measured power level by the appropriate correction factor corresponding to the frequency at which the radiometer measurement is made. The resulting weighted mean air temperature pertains to the conical volume of air of a substantially fixed apex angle (determined by radiometer antenna beam width) and a length as measured from the location of the radiometer determined by the frequency and altitude at which the radiometer measurement is made. Thus, by varying the frequency of the radiometer operation, the weighted mean temperature at various distances from the antenna can be measured in a continuous manner without introducing any physical barrier or safety hazard in the air region under examination.

The antenna beamwidth, which determines the apex angle of the conical air volume under examination, varies slightly as a function of the radiometer frequency. It is necessary, however, that said volume be affected only in length and not in apex angle as the operating frequency is varied. This is easily achieved by simply multiplying each brightness temperature $T_B$ by the ratio of the frequency at which the corresponding measurement is made to a predetermined standard frequency. A second correction factor also must be applied to the brightness temperature $T_B$ due to the fact that the radiometer components have frequency dependent characteristics that effect the amplitude of the measurement. The simplest method to eliminate performance variations with frequency is to calibrate the radiometer. Calibration can be accomplished by replacing the radiometer antenna with a wide band flat noise source and noting any changes in the measured brightness temperature $T_B$ as the radiometer is tuned over the frequency band of interest. A composite calibration or correction factor (including correction for antenna beam width and radiometer performance variations) is stored as a function of frequency in the memory unit of the present invention. A particular value of correction factor is obtained from memory in accordance with the frequency of measurement in order to correct each measured brightness temperature $T_B$.

The radiometer system of the present invention can be operated at a fixed location to observe the temperature structure produced by air masses moving past the fixed site. Alternatively, the system can be used on a moving platform to observe the temperature structure for different depths in the atmosphere as the platform moves past the weather regime. With the addition of relatively simple computer apparatus, the present invention optionally may be expanded to provide more extensive meteorological data which may be desired under certain conditions. Although such additional computer apparatus forms no part of the present invention and for that reason is not included in the preferred embodiment to be described, brief mention is considered appropriate to illustrate the relatively wide general applicability of the weighted mean air temperature value data provided by the present invention. For example, by storing each mean air temperature observation $\overline{T}_e$ and comparing it with a previous observation separated by a known time increment $\Delta t$, the temperature change $\Delta \overline{T}_e/\Delta t$ can be measured. By operating the radiometer at two or more frequencies to penetrate different depths of the atmosphere and comparing the respective temperature observations, the mean temperature-spacial gradient $\Delta \overline{E}_e/\Delta S$ can be measured throughout different depths of the atmosphere along the line of sight of the radiometer antenna. By operating the radiometer at three or more frequencies, the changes in the temperature gradient $\Delta(\Delta \overline{T}_e/\Delta S)/\Delta S$ can be measured. By measuring and comparing the temperature gradient observed at different angles of the radiometer antenna, the direction ($\Theta_{MAX}$) and magnitude $\Delta \overline{T}_e/\Delta S_{MAX}$ of the maximum temperature gradient can be measured. By assuming that the isotherms are parallel to each other within the depth of penetration, observations taken at angles other than $\Theta_{MAX}$ can be translated to provide greater temperature structure detail $$[\Delta \overline{T}_e/\Delta h, \Delta(\Delta \overline{T}_e/\Delta h)/\Delta h]$$

along the direction of the maximum temperature gradient. The factor $h$ in the last expression represents distance in the direction of the maximum gradient. The last-named technique is particularly useful for making ground based observations of the vertical temperature structure of the atmosphere.

The weighted mean air temperature value is determined by the apparatus represented in the block diagram of FIGURE 3. Reduced to its basic functions, said apparatus receives radiant power at the oxygen molecule wavelengths of interest, compares the received power to that of a reference value and adds additional locally generated power to the received power until the sum of the received and the added power is equal to that of the reference value. The received power value is determined by subtracting from the reference value the amount of locally generated power added to achieve the aforementioned equality. The measured received power value is converted into the corresponding mean air temperature value by use of the appropriate correction factor as previously discussed in accordance with the frequency at which the measurement is made.

Signals radiated by oxygen molecules are received by antenna 3 having a known directional characteristic and are applied via coupler 4 to microwave sampling switch 5. Switch 5 functions as a single pole double throw switch having two signal inputs 6 and 7 and one output 8 whose inputs are alternately connected to said output in accordance with the polarity of a bipolar audio frequency control signal on line 9 at the output of switch driver source 10. In addition to the oxygen molecule signals, there also appears on line 6 signals derived from noise lamp 11 which are applied via precision attenuator 12 and coupler 4. Lamp 11 is a conventional calibrated noise source such as the commercially available argon gas lamps. The signal on line 7 is provided directly by reference power source 13 which may be similar to lamp 11. The output signals from switch 5 on line 8 are applied via isolator 14 to balanced mixer 15. Mixer 15 also is connected to variable frequency local oscillator 16. The frequency of oscillator 16 is adjusted in accordance with the frequency at which a given radiometer measurement is desired. Only those signal components at the output of isolator 14 which differ from the radiometer intermediate frequency by the frequency of local oscillator 16 pass through I.F. amplifiers 17 and are detected in detector and video amplifier 18.

It should be noted that the signals at the output of detector 18 alternately represent the two power spectra on lines 6 and 7 at the inputs to switch 5. The frequency of alternation is established by the control signal provided by switch driver 10 as previously mentioned. Said control signal also is applied via line 19 to synchronous detector 20 which receives the output signals from detector 18. Synchronous detector 20 alternately detects each of the two power spectra at the rate at which they are sampled and reverses the polarity of one spectrum relative to the other so that the two spectra are effectively subtracted from each other. The difference in the values between the two power spectra are averaged in integrator 21 in order to minimize noise and to increase measurement sensitivity. The integrated difference signal is amplified by servo amplifier 22 and applied to servomotor 23 to control the direction thereof in accordance with the polarity of the difference signal.

Motor 23 drives attenuator 12 in a direction and an amount so that the sum of the attenuated noise power from lamp 11 and the received power from antenna 3 equals the power from reference power source 13. When equality is achieved, the integrated difference signal at the output of integrator 21 reduces to zero and servomotor 23 stops rotating. The value of the received signal power is determined with the aid of potentiometer 24 and subtraction circuit 25. Servomotor 23 drives potentiometer 24 synchronously with attenuator 12 to produce a signal on line 26 representing the magnitude of the noise power added to the signal received by antenna 3 to equal the reference power source 13. The signal on line 26 is subtracted in circuit 25 from the signal on line 27 representing the reference power source 13 to yield a signal on line 28 representing the value of the unknown signal power received by antenna 3.

It will be recalled that the measured power level (represented by the signal on line 28) of the oxygen molecule radiation received by antenna 3 is translated into respective mean air temperature value by operating upon it with the appropriate correction value corresponding to the frequency at which the radiometer power level measurement is made. The translation is accomplished with the aid of frequency control source 29, analog-to-digital converter 30, addressable memory 31, transducer 32 and potentiometer 33. Frequency control source 29 provides an output control signal for determining the frequency of tunable local oscillator 16 which is, for example, a tunable backward wave oscillator. Said control signal also is applied to analog-to-digital converter 30 which provides a digital output signal for addressing memory 31. Memory 31 stores the appropriate correction values corresponding to the frequency of operation. Memory 31 also stores the appropriate distance (S) values corresponding to the frequency and altitude of operation. Memory 31 provides in a conventional manner an output digital signal on line 36 representing the correction factor value corresponding to the digital number of convertor 30 which, in turn, represents the frequency to which the radiometer is tuned. Memory 31 also provides on line 37 an output signal representing the depth of penetration distance (S) corresponding to the frequency of measurement and the pressure altitude of the radiometer. The digital signal output representing the correction factor is converted by transducer 32 into an equivalent position of shaft 35 for driving the wiper of potentiometer 33. The signal $T_B$ on line 28 representing the power level of the signals received by antenna 3 energizes potentiometer 33 and produces on output line 34 a signal representing the product of the signals on line 28 and on shaft 35 which product signal represents the desired weighted mean temperature value of the specified volume of atmosphere under examination.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for measuring the mean temperature of a volume of atmosphere of known cross section and length, said atmosphere including a substantially uniform distribution of oxygen molecules, said system comprising:

a tunable radiometer including a directional antenna having a known beam pattern cross section corresponding to said cross section of said volume, said radiometer being tuned to receive input signals radiated by said oxygen molecules at a known frequency corresponding to said known length and producing an output signal representing the power level of said input signals, means responsive to the tuning of said radiometer for producing a multiplier signal representing a correction factor to be applied to said output signal to take into account antenna beam width and radiometer performance at said known frequency, means responsive to the tuning of said radiometer for producing a depth of penetration signal representing said predetermined length at said known frequency, and means adapted to receive said output signal and said multiplier signal for producing a product signal representing the product of the power level of said input signal and said correction factor.

2. A system as defined in claim 1 wherein said radiometer comprises a source of reference power signals, a source of controllable power signals, means for adding said controllable power signals to said received input signals to produce a sum signal, signal comparing means receiving said sum signal and said reference power signals to produce an error signal representing the difference therebetween, and means for applying said error signal to said source of controllable power signals to determine the power level thereof.

3. A system as defined in claim 1 wherein said radiometer is tunable in response to a frequency control signal over a band of frequencies including the spectrum of said input signals, said system further comprising a variable source of said frequency control signal connected to said radiometer and to said means for producing said multiplier signals and said depth of pentration signal, said means for producing said multiplier signal and said depth of pentration signal being controllable in response to said frequency control signal to vary said multiplier signal and said depth of penetration signal, respectively, in accordance with said frequency control signal.

4. A system as defined in claim 3 wherein said radiometer comprises a source of reference power signals, a source of controllable power signals, means for adding said controllable power signals to said received input signals to produce a sum signal, signal comparing means receiving said sum signal and said reference power signals to produce an error signal representing the difference therebetween, and means for applying said error signal to said source of controllable power signals to determine the power level thereof.

5. A system as defined in claim 2 and further comprising means providing a first signal representing the power level of said controllable power signals, means providing a second signal representing the power level of said reference power signals, and subtraction circuit means receiving said first and second signals to produce said output signal representing the power level of said input signals.

6. A system as defined in claim 4 and further comprising means providing a second signal representing the power level of said controllable power signals, means providing a second signal representing the power level of said reference power signals, and subtraction circuit means receiving said first and second signals to produce said output signal representing the power level of said input signals.

References Cited

UNITED STATES PATENTS 3,056,958 10/1962 Anderson _____ 343—112
3,167,714 1/1965 Seling _____ 73—355 X RODNEY D. BENNETT, *Primary Examiner.*

R. E. BERGER, *Assistant Examiner.*